United States Patent [19]

Shulman

[11] Patent Number: 4,555,613
[45] Date of Patent: Nov. 26, 1985

[54] IMAGE SENSING AND WELDING ARRANGEMENT FOR MANIPULATOR WELDING APPARATUS

[75] Inventor: Burt H. Shulman, Salt Point, N.Y.

[73] Assignee: Unimation, Inc., Danbury, Conn.

[21] Appl. No.: 661,587

[22] Filed: Oct. 17, 1984

[51] Int. Cl.[4] .............................................. B23K 9/00
[52] U.S. Cl. .......................... 219/124.34; 219/130.01; 219/136; 901/42; 901/47
[58] Field of Search .................... 219/130.01, 124.34, 219/136; 358/100, 101, 107, 901; 901/19, 42, 47

[56] References Cited

U.S. PATENT DOCUMENTS

| 4,380,696 | 4/1983 | Masaki | 219/124.34 |
| 4,417,127 | 11/1983 | Nachev et al. | 219/124.34 |
| 4,491,715 | 1/1985 | Voronin et al. | 219/124.34 |
| 4,491,719 | 1/1985 | Corby, Jr. | 219/124.34 |
| 4,492,847 | 1/1985 | Masaki et al. | 219/124.34 |

Primary Examiner—Clifford C. Shaw
Attorney, Agent, or Firm—Mason, Kolehmainen, Rathburn & Wyss

[57] ABSTRACT

A combined image sensing and welding torch hand is provided for programmable manipulator welding apparatus. During a sensing operation the sensing components emerge from a protective enclosure which surrounds the welding torch and move linearly downwardly to a sensing position outside the protective enclosure. During the welding operation, the sensing components are retracted back into the protective enclosure and staging doors, which are pivotally mounted on the bottom edge of the protective enclosure are closed so as to completely shield the sensing components from welding fumes and splatter. In addition, when the sensing assembly is in the retracted position within the protective housing, air under pressure is supplied to the interior of the enclosure to provide a purge during the welding cycle and prevent fumes from entering the enclosure and damaging the optical components of the sensing assembly.

24 Claims, 16 Drawing Figures

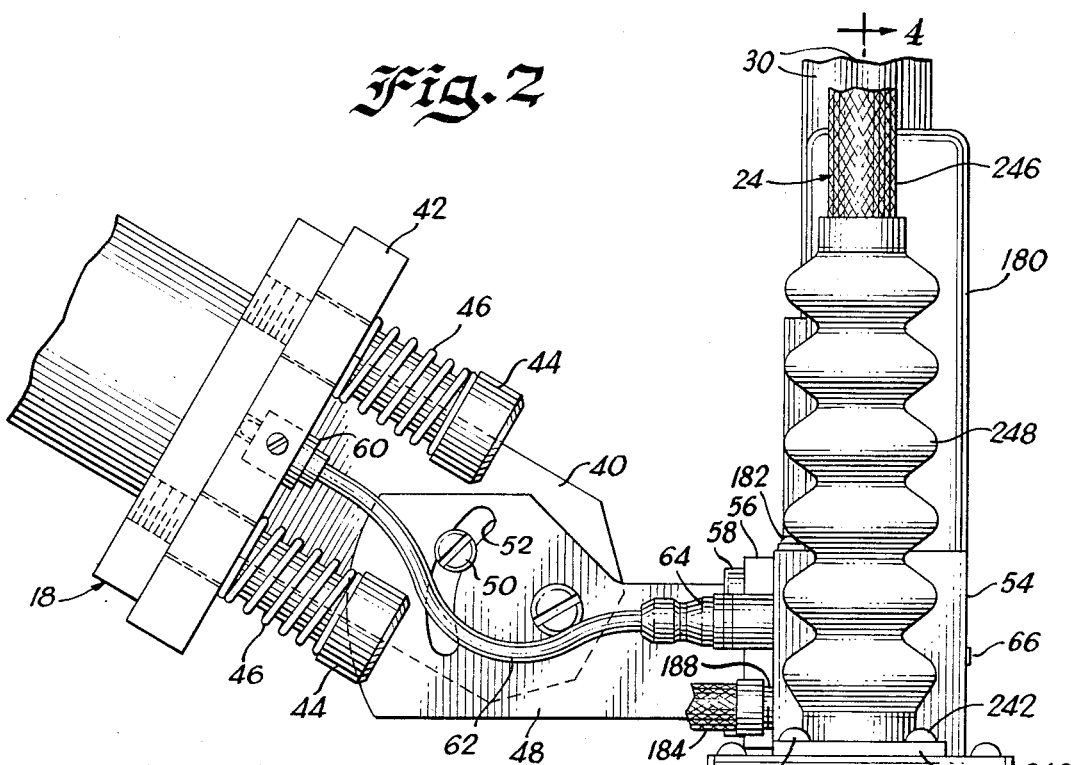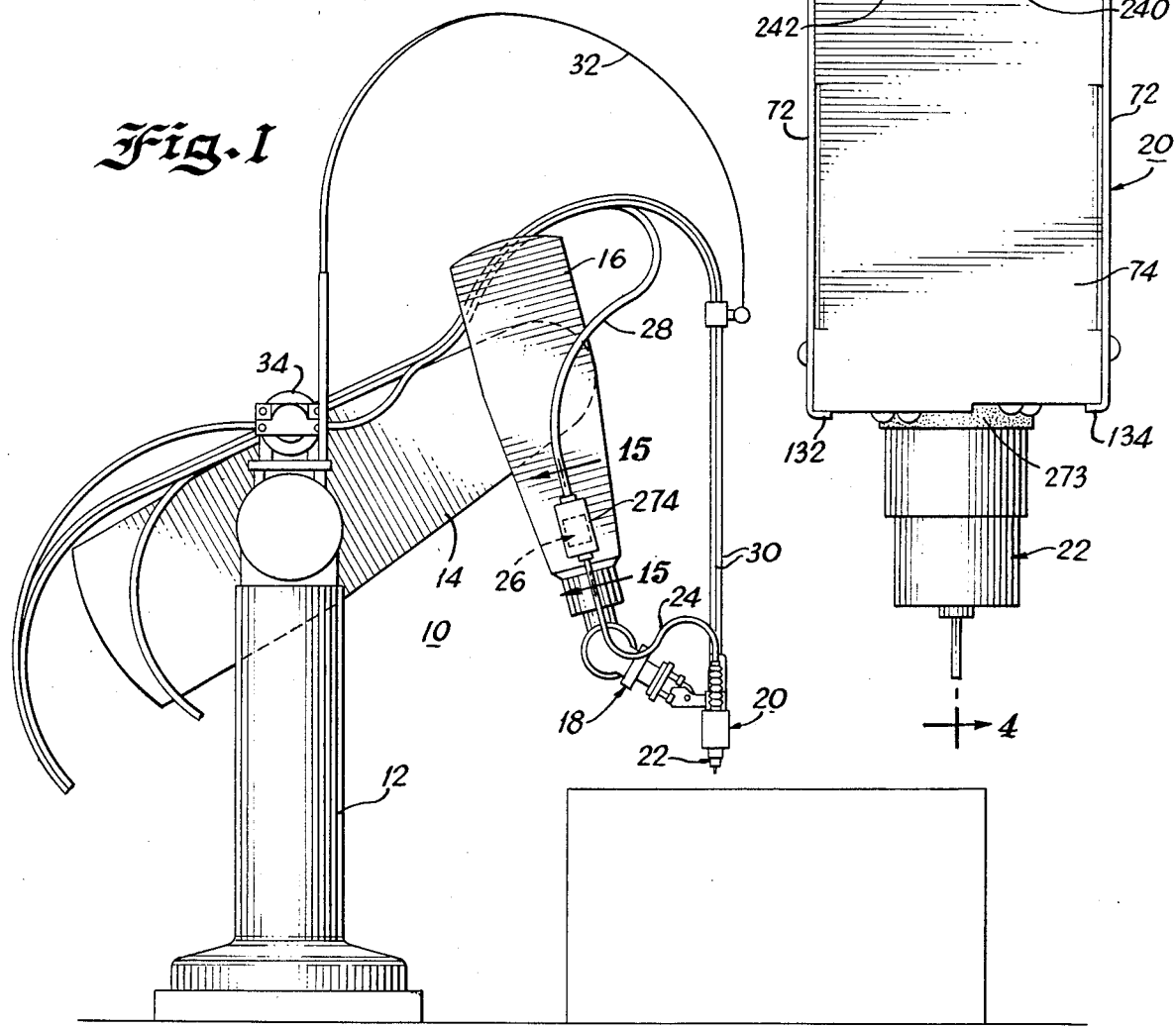

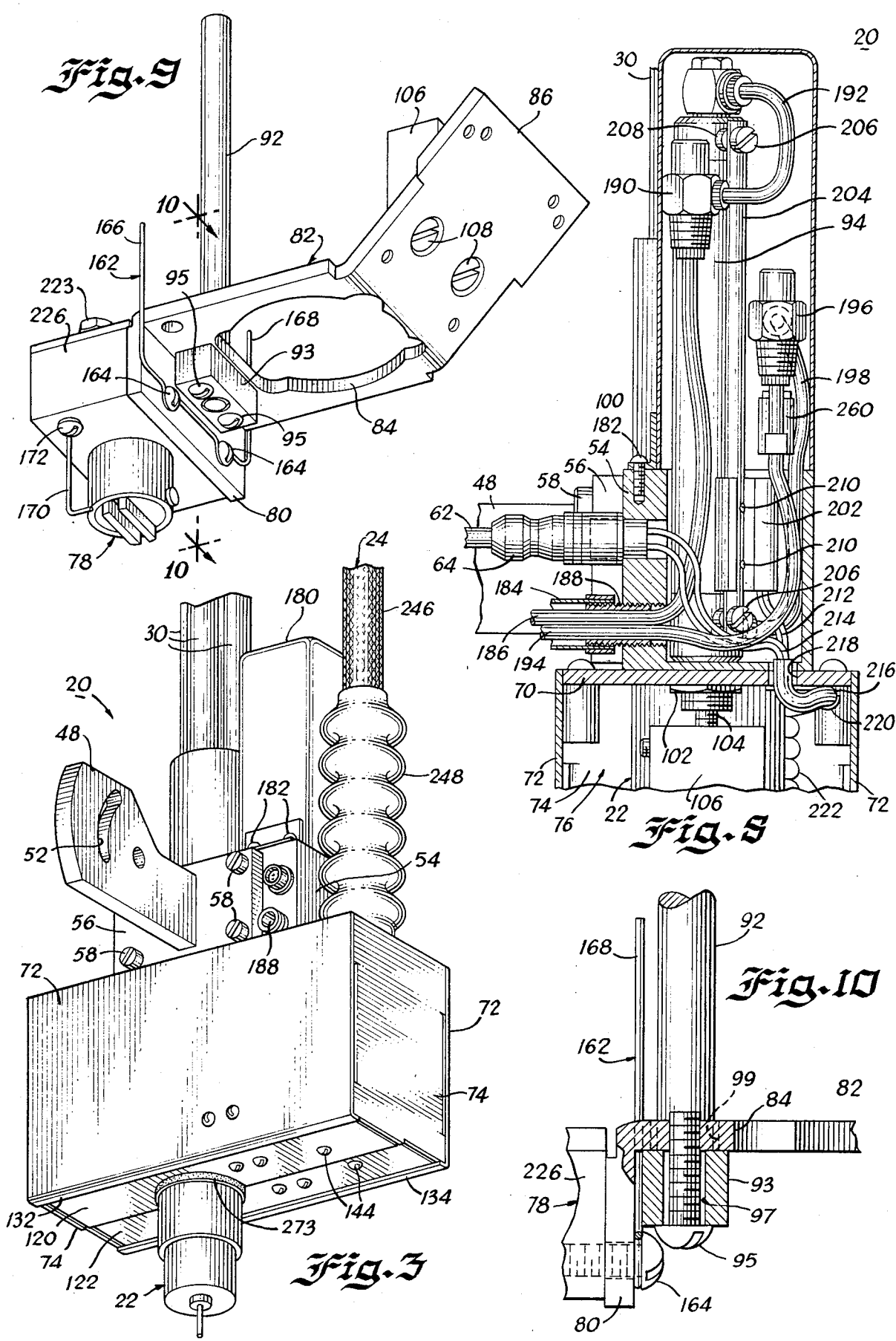

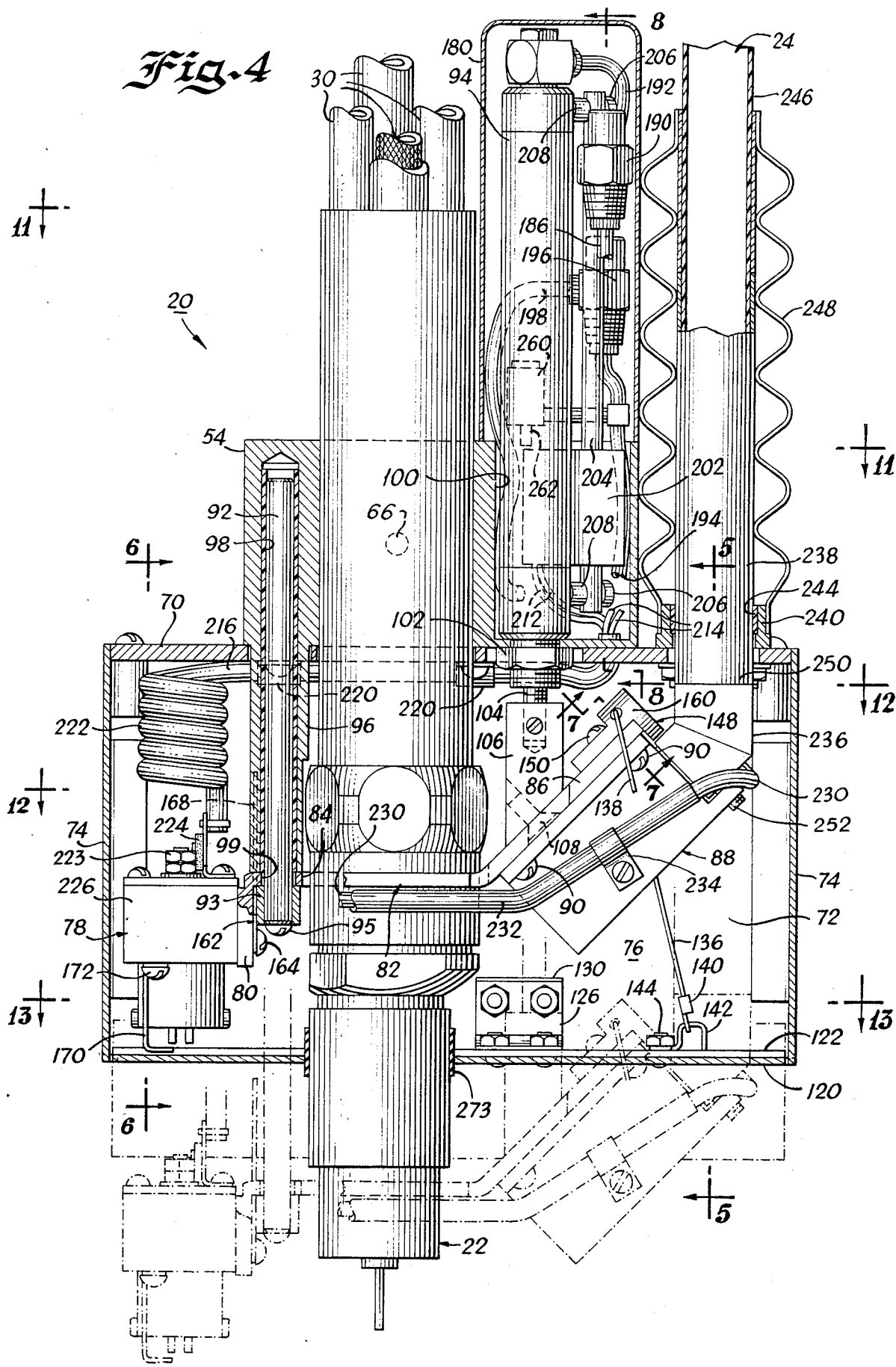

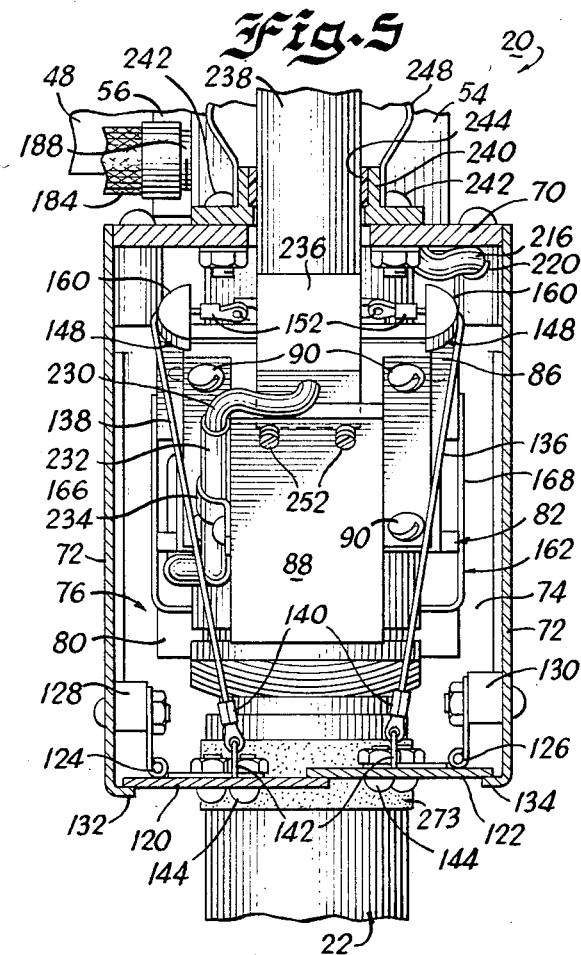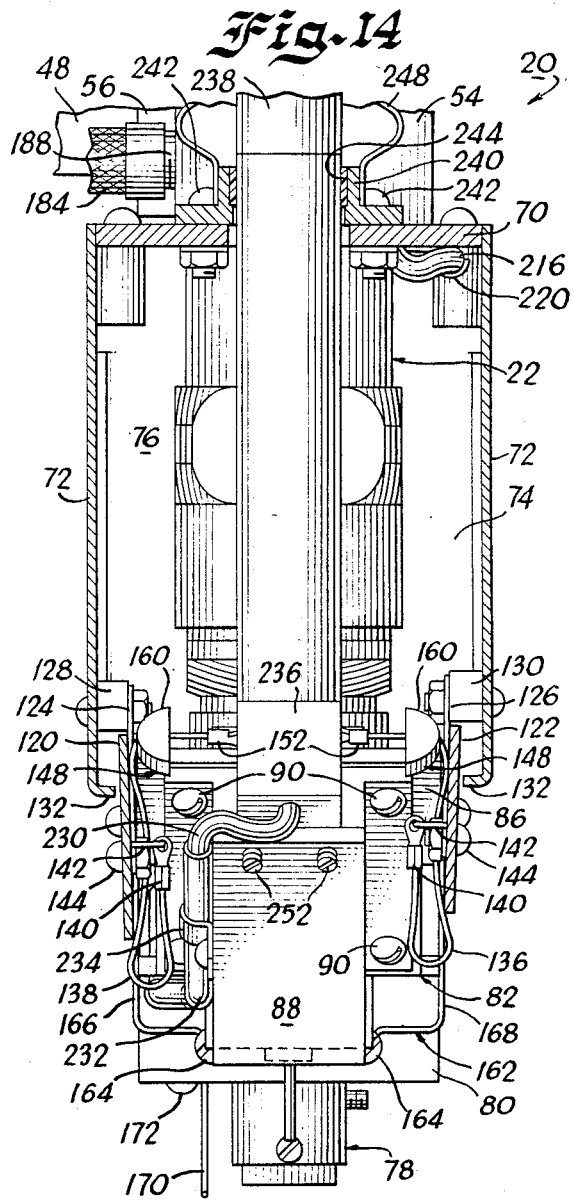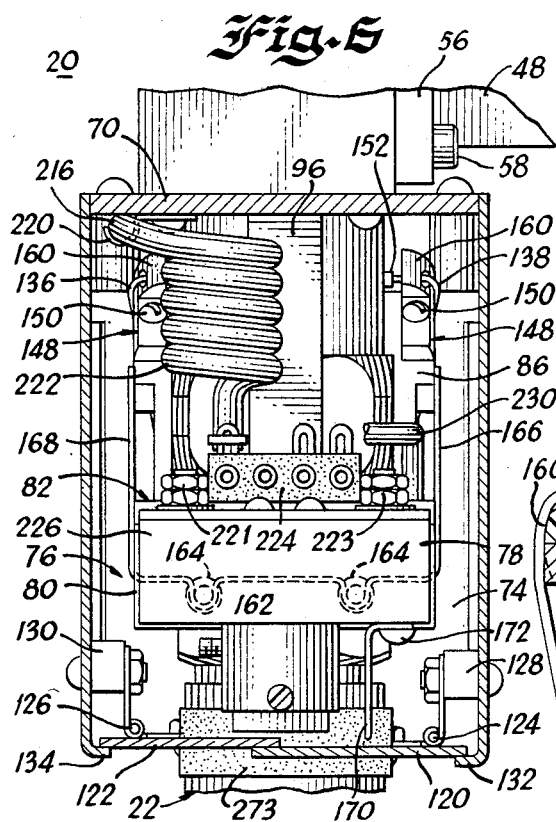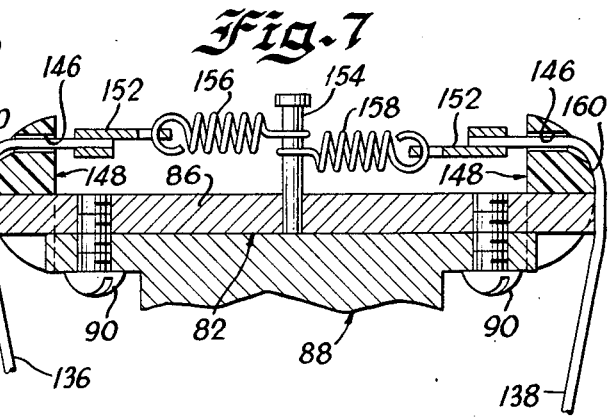

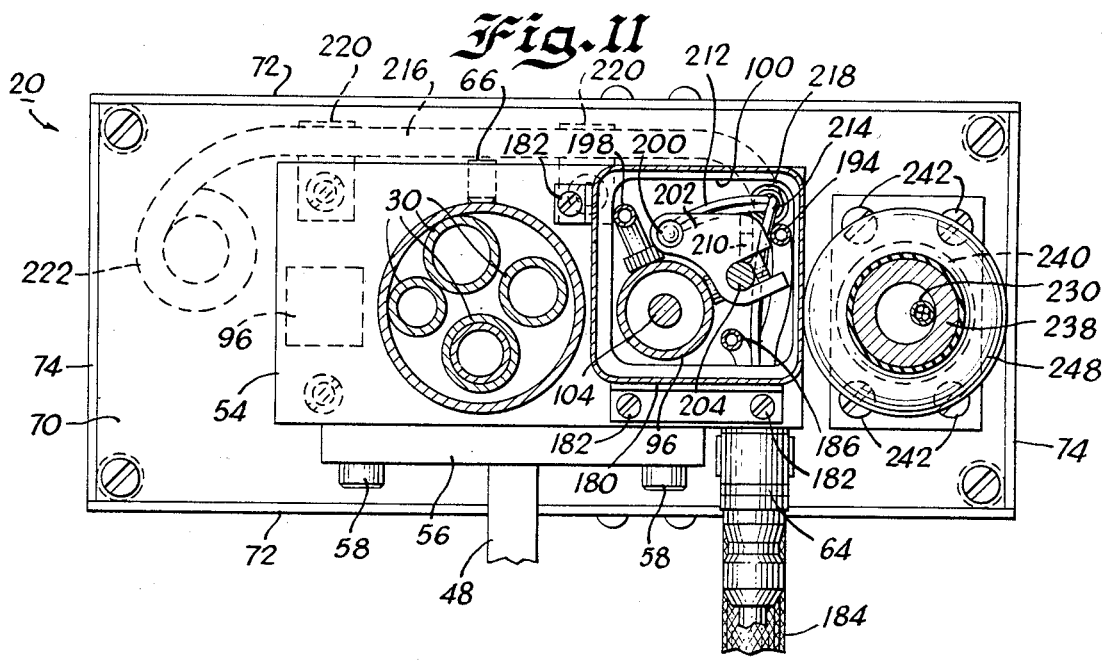
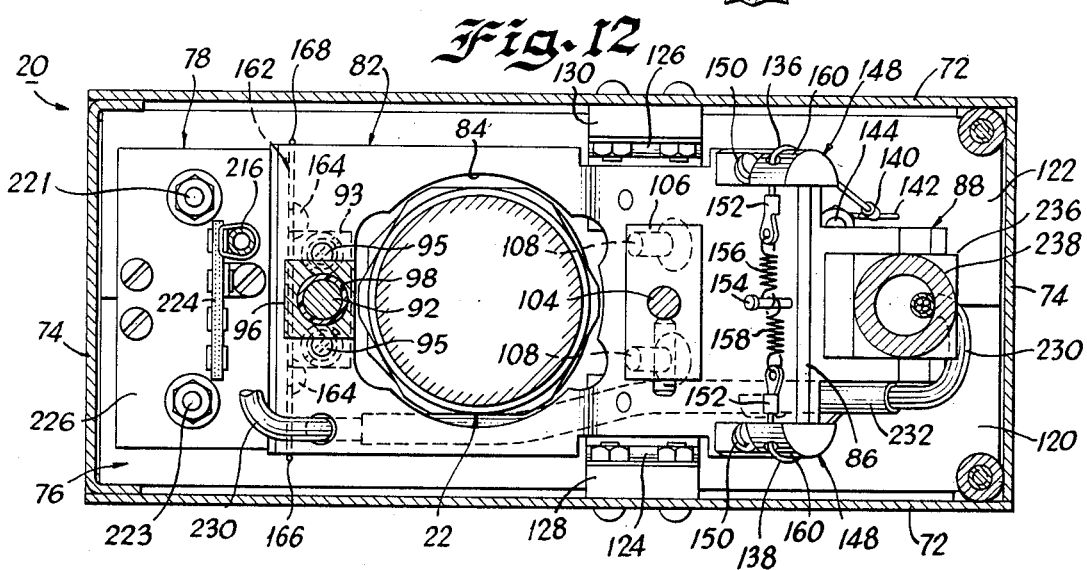
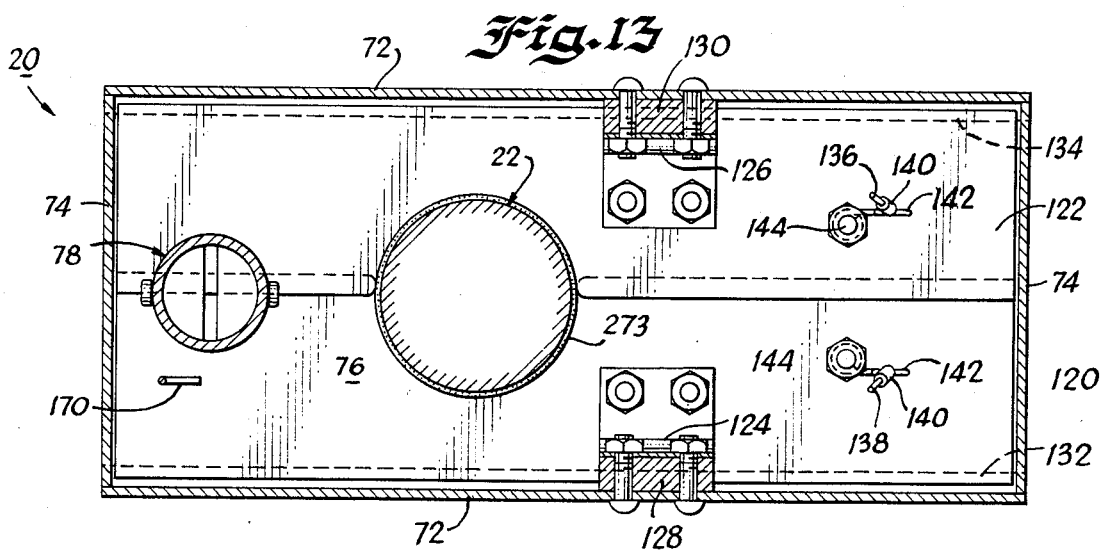

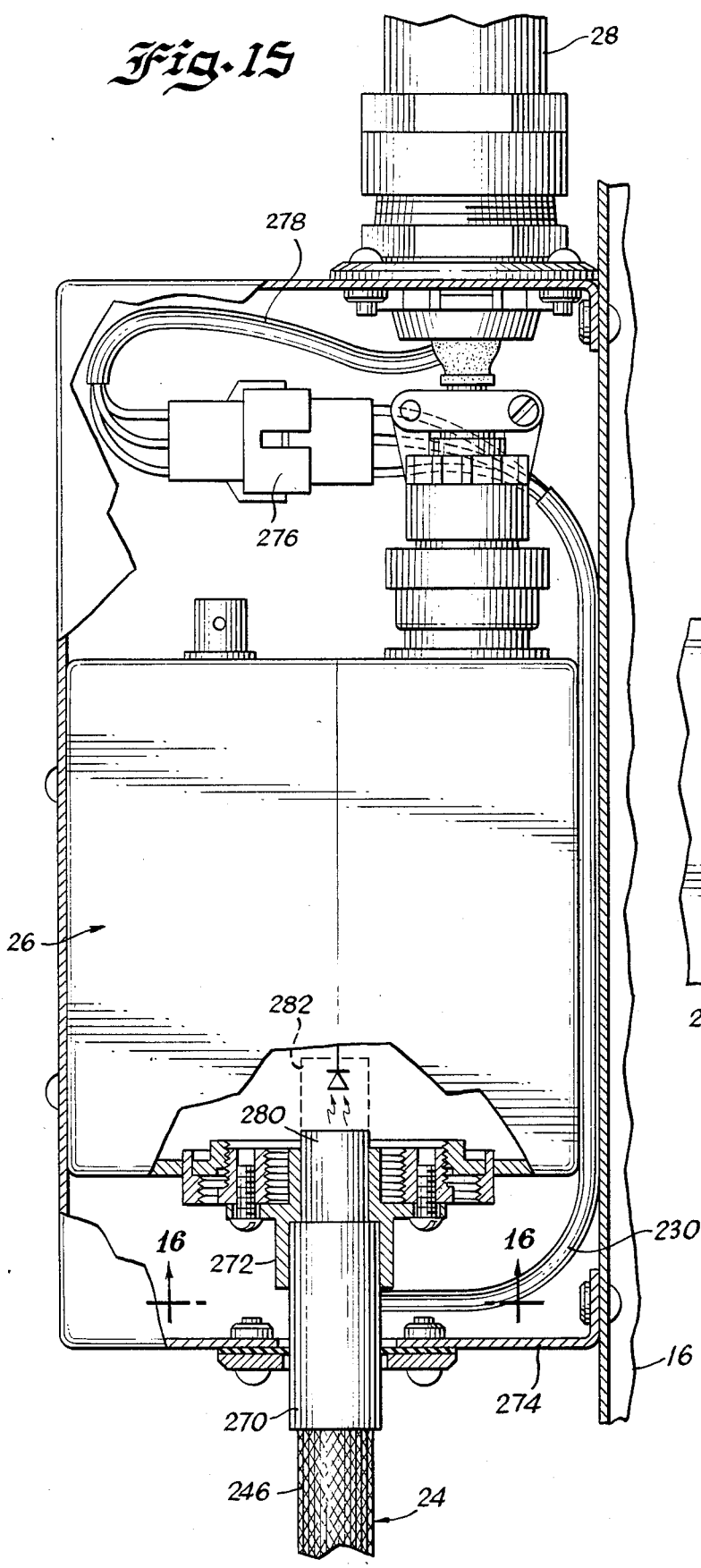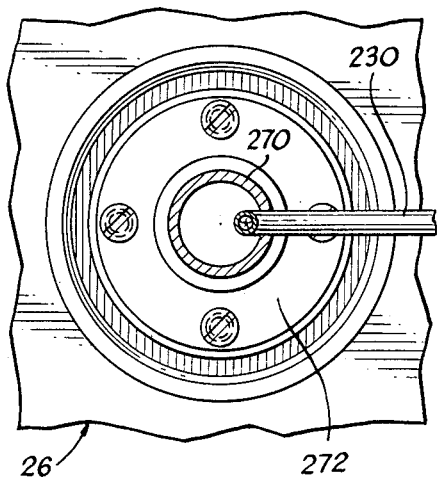

IMAGE SENSING AND WELDING ARRANGEMENT FOR MANIPULATOR WELDING APPARATUS

CROSS REFERENCE TO RELATED APPLICATIONS

This application is directed to improvements in the manipulator welding apparatus disclosed in Masaki U.S. Pat. No. 4,380,696, issued Apr. 19, 1983 and Masaki et al application Ser. No. 307,174, filed Sept. 30, 1981, said patent and application being incorporated herein by reference for all purposes.

BACKGROUND OF THE INVENTION

A. Field of the Invention

The present invention relates generally to manipulator welding apparatus equiped with a vision system for weld seam tracking and more particularly to an improved image sensing and welding arrangement for such manipulator apparatus.

B. Description Of The Prior Art

Various vision detection systems have been proposed for use in connection with manipulator welding apparatus. For example, Masaki U.S. Pat. No. 4,380,696 and Masaki et al application Ser. No. 307,174 now U.S. Pat. No. 4,492,847 both disclose arrangements wherein separate manipulator hands are provided for the welding torch and an image sensing unit. In Masaki U.S. Pat. No. 4,380,696 the image sensing hand includes an optical pattern projector and a solid state TV camera, the optical pattern projector providing a light slit pattern on the workpiece which is viewed by the TV camera to provide an image representing the welding area during both a teaching phase in which a reference image is stored and during playback cycles during which the image corresponding to each workpiece is stored and employed to correct the stored program of the manipulator. In Masaki et al application Ser. No. 307,174 the image sensing hand comprises an optical pattern projector and a lens system which is connected by means of a fibre optic cable to a remotely located camera unit. In both of these two hand arrangements, considerable time is lost in picking up and setting down each hand during a particular welding operation. Also the space required to store both the welding torch hand and the image sensing hand when not being used is undesirable in many instances.

Both Masaki U.S. Pat. No. 4,308,696 and Masaki et al application Ser. No. 307,174 appreciate that it is desirable to remove the image sensing unit from the welding environment during the actual welding of the seam so that the vision system is not exposed to the welding environment and optical noise resultingtherefrom. When separate image sensing hands are provided the image sensing unit is automatically removed from the welding environment but suffers from the disadvantages mentioned above. In an effort to eliminate the requirement of picking up and setting down individual welding gun and image sensing hands, both the Masaki patent and the Masaki et al application disclose alternative arrangements wherein the manipulator hand is provided with both the welding torch and image sensing units. In Masaki U.S. Pat. No. 4,308,696 the manipulator hand carries an arrangement in which the weld torch tip is located diametrically opposite the optical center point of the image sensing unit and the manipulator hand is then rotated 180° to move the image sensing unit above the workpiece when the weld torch is performing an actual welding operation. In Masaki et al application Ser. No. 307,174, the image sensing unit is rotated to a point above the welding torch after the first image sensing pass over the workpiece so that it is vertically above the workpiece during the actual welding operation. In both of these prior art arrangements, the image sensing unit is still relatively close to the welding environment and the optical lens system suffers deleterious effects from the fumes and splatter during the actual welding operation. Also, these arrangements for rotating the image sensing unit to a point above the welding torch require substantial additional space which may interfere with the welding operation due to clearance problems with obstructions on or around the workpiece being welded.

SUMMARY OF THE INVENTION

Accordingly, it is a principle object of the present invention to provide a new and improved image sensing arrangement for manipulator welding apparatus which avoids one or more of the above discussed disadvantages of prior art arrangements.

It is another object of the present invention to provide a new and improved image sensing arrangement for manipulator welding apparatus wherein a weld torch is permanently connected to the manipulator hand so that it can be moved over a desired programmed path by controlling the arm and hand axes of the manipulator and an image sensing assembly is normally mounted within a housing which surrounds the weld torch near its tip, said assembly being moveable along the longitudinal axis of the welding torch to a sensing position which is outside said housing.

It is a further object of the present invention to provide a new and improved image sensing assembly for use with manipulator welding apparatus wherein an objective lens image sensing unit is connected through a short length of fibre optic cable to a camera positioned on the forearm portion of the manipulator apparatus so that movement of the manipulator hand in its coordinate axes is readily accomplished without requiring a long, heavy fibre optic cable connection to a camera positioned remotely of the entire manipulator apparatus.

It is a further object of the present invention to provide a new and improved image sensing arrangement for manipulator welding apparatus wherein an image sensing assembly is normally positioned in an enclosed housing adjacent the tip of the welding torch and means are provided for preventing the entry of smoke and fumes into the housing during the welding operation.

Briefly considered, the arrangement of the present invention comprises a combination sensing hand and welding torch hand. During a sensing operation the sensing components emerge from a protective enclosure which surrounds the welding torch and move linearly downwardly to a sensing position outside the protective enclosure. During the welding operation, the sensing components are retracted back into the protective enclosure and staging doors, which are pivotally mounted on the bottom edge of the protective enclosure are closed so as to completely shield the sensing components from welding fumes and splatter. In addition, when the sensing assembly is in the retracted position within the protective housing, air under pressure is supplied to the interior of the enclosure to provide a purge during the welding cycle and prevent fumes from entering the enclosure and damaging the optical components of the sensing assembly.

The invention, both as to its organization and method of operation, together with further objects and advantages thereof, will best be understood by reference to the following specification taken in connection with the accompanying drawings in which:

FIG. 1 is a side elevational view of an industrial robot on which the image sensing arrangement of the present invention is mounted;

FIG. 2 is an enlarged portion of the hand portion of the robot of FIG. 1;

FIG. 3 is a perspective view of the image sensing assembly of the present invention;

FIG. 4 is a cross sectional view taken along the lines 4—4 of FIG. 2;

FIG. 5 is a cross sectional view taken along the line 5—5 of FIG. 4;

FIG. 6 is a cross sectional view taken along the line 6—6 of FIG. 4;

FIG. 7 is an enlarged cross sectional view taken along the line 7—7 of FIG. 4;

FIG. 8 is a cross sectional view taken along the line 8—8 of FIG. 4;

FIG. 9 is a perspective view of a partially assembled bracket used to support the optical subassembly of FIG. 1;

FIG. 10 is an enlarged cross sectional view taken along the line 10—10 of FIG. 9;

FIG. 11 is a plan sectional view taken along the line 11—11 of FIG. 4;

FIG. 12 is a plan sectional view taken along the line 12—12 of FIG. 4;

FIG. 13 is a plan sectional view taken along the line 13—13 of FIG. 4;

FIG. 14 is a view similar to FIG. 5 but showing the doors of the protective enclosure in an open position;

FIG. 15 is a sectional side elevational view of the fibre optic connection to the camera in the industrial robot arrangement of FIG. 1; and FIG. 16 is a sectional view taken along the line 16—16 of FIG. 15.

Referring now to the drawings, and more particularly to FIG. 1 thereof, the present invention is therein illustrated in conjunction with an industrial robot indicated generally at 10 having a rotatable base portion 12 on the upper end of which is pivotedly mounted an upper arm portion 14. A forearm portion 16 is pivotably mounted on the outer end of the arm portion 14 and carries on its outer end a manipulator hand 18 which is rotatable in a plurality of axes relative to the forearm 16. A combined image sensing and welding assembly indicated generally at 20, is connected to the manipulator hand, by means described in more detail hereinafter, the assembly 20 including a welding torch 22 which extends downwardly from the assembly 20. The assembly 20 also includes a light projector unit and image sensing lens assembly which are movable as a unit out of the bottom of the assembly 20 to a position somewhat below the welding torch 22 so that an image of the workpiece to be welded can be obtained during a first pass of the manipulator arm over the workpiece, the workpiece image being compared with a reference image in an image processor, as described in detail in Masaki U.S. Pat. No. 4,380,698 and Masaki application Ser. No. 307,174 discussed above. More particularly, the image sensing lens portion of the assembly 20 is connected by means of a short length of fibre optic cable 24 to a solid state TV camera 26 which is mounted on the forearm 16, the fibre optic cable 24 being directly coupled to the photo diode array of the camera 26 by means of a fibre optic face plate and locating mount, as will be described in more detail hereinafter. The video output signal from the camera 26 is supplied over the cable 28 to the image processor portion of the control console (not shown) associated with the industrial manipulator arm 10. The hoses 30 and wire feed tube for the welding torch 22 are supported by the cable support 32 which also forms a portion of the wire feed assembly 34 to permit movement of the manipulator hand 18 throughout the entire work space of the robot 10.

Considering now in more detail the manner in which the combined image sensing and welding assembly 20 is supported on the manipulator hand 18, a mounting plate 40 is releasably mounted on the manipulator hand 18 by means of an end flange 42 through which extend the studs 44 which project from the end of the manipulator hand 18, the coil springs 46 normally acting to hold the end flange 42 against the end plate of the manipulator hand 18. A second mounting plate 48 is pivotally mounted on the plate 40 and may be adjusted relative thereto by means of the set screw 50 in the plate 40, which extends through the arcuate opening 52 in the plate 48. A mounting block 54 is secured to the end flange 56 of the plate 48 by means of the bolts 58 so that the mounting block 54 is rigidly mounted on the end of the plate 48. However, in order to protect the optical components within the assembly 20 from damage in the event that the manipulator arm is moved to a point at which the assembly 20 strikes a fixed object, a crash switch 60 is positioned between the members 18 and 42 and is arranged to be actuated if the end flange 42 moves relative to the manipulator hand 18 when a fixed object is encountered and one or more of the springs 46 is compressed to permit such action. The crash switch 60 is connected by means of the wires 62 to a connector 64 in the side of the mounting block 54 and closure of its contacts may be employed to stop movement of the robot arm by any suitable arrangement.

The mounting block 54 provides a rugged fixed mounting arrangement for the welding torch 22 which extends through a central opening in the mounting block 54 and is secured thereto by means of the set screw 66. In order to provide a protective enclosure or housing for the image sensing components of the assembly 20 a top plate 70 is secured to the bottom surface of the mounting block 54 and the side walls 72 and end walls 74 are secured thereto to provide the enclosed space 76 within which the image sensing unit is positioned during a welding operation. This image sensing unit comprises a light projector unit 78 which is mounted on the right angle end flange 80 of a bracket 82, the bracket 82 having a clearance opening 84 therein so that it can move relative to the weld torch 22. The bracket 82 is provided with a 45 degree end portion 86 on which a lens assembly 88 is mounted by means of the screws 90, the axis of the lens system 88 extending downwardly at an angle of 45° to the vertical to detect the light pattern projected onto the workpiece by the light projector unit 78. The light projector unit 88 is preferably of the type wherein an incandescent lamp is employed that has an elongated light emitting filament arranged perpendicularly to the light projection axis to provide an efficient means for developing a slit of light which is projected onto the work piece during an image sensing operation, as described in detail in said copending Masaki application Ser. No. 307,174. However, in accordance with an important aspect of the present invention the light slit developed by the unit 78 is projected directly down onto the work, rather than at an angle to the work as in said Masaki application, so that a very narrow high intensity slit of light is projected onto the workpiece. The lens assembly 88 can then detect or "see" this narrow light strip with a greater signal to noise ratio so that a well defined correlation peak is provided by the image processor portion of the associated control equipment.

In order to provide an arrangement for accurately and dependably positioning the image sensing assembly 78,88 at a desired sensing position relative to the welding torch 22, the bracket 82 is slidably mounted in the mounting block 54 by means of a rod 92 and is actuated between an upper position (shown in full lines in FIG. 4) in which the image sensing components are positioned within the housing 76, and a lower position (shown in dotted lines in FIG. 4) in which these components are positioned below the end of the welding torch 22, the bracket 82 being moved between these two positions by means of an air cylinder 94. More particularly, the mounting block 54 is provided with a downwardly depending bearing post 96 within which is positioned a sleeve bearing 98 for the rod 92. The rod 92 is press fitted within a block 93 (FIG. 10) which is mounted on the bracket 82 by means of the screws 95. The air cylinder 94 is positioned within a well 100 formed in the mounting block 54 and is secured within the well 100 by means of the nut 102. The piston rod 104 of the cylinder 94 is secured to a member 106 which has a 45° end surface secured to the portion position 86 of the bracket 82 by means of the screws 108. It will thus be seen that the post 92, which is slidably mounted within the sleeve bearing 98, and the piston rod 104, which is slidably mounted within the air cylinder 94, provide a pair of spaced apart bearings for the image sensing assembly 78, 88 mounted on the bracket 82 whereby this image sensing assembly may be accurately and repeatedly located at a desired image sensing position relative to the workpiece. Furthermore, the spaced apart bearings provide an arrangement whereby the image sensing assembly 78, 88 may be moved downwardly a distance of approximately 3 inches while maintaining the accurate location of the image sensing unit so that a clear view of the workpiece can be obtained with the arrangement of the present invention. In order to provide adjustment for variations in manufacturing tolerances and during assembly, so that the spaced apart bearings may be adjusted to provide smooth movement over the desired distance without binding, the block 93 is provided with oversized mounting holes 97 (FIG. 10) for the screws 95 and the bracket 82 is provided with a clearance opening 99 so that the post 92 and block 93 may be adjusted relative to the bracket 82 before the screws 95 are tightened.

In order that the imaging sensing assembly 78, 88 may be completely enclosed within the space 76 when an image sensing operation is not being performed and so that the lens assembly 88 will not be damaged by splatter during the welding operation, a pair of doors 120 and 122 are pivotably mounted on the sidewalls 72 by means of the hinges 124 and 126, respectively. In order that the doors 120, 122 are effective to seal the space 76 when the doors are closed, the hinges 124, 126 are spaced inwardly from the wall 72 by means of the spacers 128 and 130 and the bottom edges of the wall 72 are provided with inturned lip portions 132 and 134 which overlap the outer edges of the doors 120 and 122, respectively. Also, the door 120 is made wider than the door 122 so that it overlaps the inner edge of the door 122 when the doors are closed.

The doors 120, 122 are held in the closed position shown in FIGS. 5 and 6 by means of a pair of flexible cables 136 and 138. More particularly one end of each of the cables 136, 138 is provided with an eyelet 140 which is flexibly connected to a U-shaped wire 142 (FIG. 4) mounted on the door by means of the bolt 144. The other end of each of the cables 136, 138 extends through an opening 146 (FIG. 7) in a block 148 mounted on the upper corners of the portion 86 of the bracket 82 by means of the screw 150 (FIG. 4), the upper ends of the cables 136, 138 being provided with eyelets 152 which are connected to a central pin 154 through the coil springs 156 and 158. The blocks 148 are provided with rounded head portions 160 (FIG. 5) over which the flexible cables 136, 138 can move so that the doors can be smoothly actuated to the closed position and held in this position by the springs 156, 158.

When the image sensing assembly 78, 88 is moved downwardly to the image sensing position shown in FIG. 14, the cables 136, 138 move with this assembly so that the doors 120, 122 drop of their own weight to permit the image sensing assembly to be moved to the image sensing position shown in FIG. 14. In order to hold the doors 120, 122 fully open and to prevent them from catching on edges of the image sensing assembly as it is retracted back into the housing, a wire 162 (FIG. 14) is secured to the end portion 80 of the bracket 82 by means of the screws 164 and is provided with a pair of upstanding end portions 166 and 168 which engage the inner surfaces of the doors 120 and 122 and hold these doors in the fully open position shown in FIG. 14. As the image sensing assembly is retracted back into the housing the wire portions 166, 168 function to maintain the doors 120, 122 fully open until the subassembly has been moved past the lower ends of these wire portions 166, 168.

In order to prevent the doors from jamming as they are closed and to ensure that the narrow door 122 will close first, a staging wire 170, which is secured to the light projector unit 78 by means of the screw 172 is positioned to extend downwardly below the light projector unit 78 so that it will engage the wide door 120 and prevent this door from closing first. Also, the cable 136 (FIGS. 5 and 6) is preferrably shorter than cable 138 so that the narrow door 122 starts to close first. Accordingly, as the image sensing assembly moves upwardly to the fully enclosed position shown in FIG. 4 the cable 136 will close the narrow door 122 first while the staging wire 170 restrains the wide door 120. As the assembly reaches the fully enclosed position the staging wire 170 moves upwardly by an amount sufficient to permit the wide door 120 to be held against the narrow door 122, as shown in FIGS. 5 and 6, under the force of the springs 156 and 158. It should be noted that with the above described arrangement the doors 120, 122 can be opened and closed in the correct sequence irrespective of the orientation of the welding torch 22. For example, if the welding torch 22 is in a horizontal position the doors 120, 122 will be forced open initially by engagement of the staging wire 170 with the door 120, then by engagement of the light projector unit 78 with the door 122 and finally by engagement of the wire portions 166, 168 with the respective doors. The correct sequence of closing the doors is also accomplished by the staging wire 170 when the welding torch 22 is horizontal, the doors again being held tightly sealed by the springs 156, 158 when the image sensing assembly is in the fully enclosed position. Again, if the welding torch 22 is oriented so that the sidewall 72 are horizontal and the wide door 120 is positioned above the narrow door 122, the staging wire 170 will again function to prevent the door 120 from closing of its own weight in the wrong sequence so that the doors may be properly closed without jamming.

As discussed generally heretofore the air cylinder 94 is positioned within the well 100 provided in the mounting block 54. A housing 180 is secured to the top of the mounting block 54 by means of the screws 182 (FIG. 8) so that the air cylinder 94 and its associated control valves are totally enclosed. The air control lines for the air cylinder 94 are brought in through the braided conduit 184, it being understood that these control lines are normally available at the manipulator hand to control gripping members, or the like. Specifically, the control line 186 (FIG. 8) is supplied through the threaded bushing 188 in the sidewall of the block 54 to the well 100 and extends upwardly to a manually adjustable control valve 190 which controls the supply of air through the tubing 192 to the upper end of the cylinder 94. The other control line 194 extends through the bushing 188 to a manually adjustable control valve 196 which controls the flow of air through the tubing 198 to the bottom end of the cylinder 94.

In accordance with an important aspect of the present invention, a sensing arrangement is employed to verify that the piston rod 104 has actually been moved to the desired position in response to air supplied to one of the control lines 186 or 194. With such an arrangement the fact that the image sensing assembly has been moved out of its enclosed housing to the image sensing position can be verified before the sensing assembly is moved along the desired weld path to provide successive images of the workpiece for the image processor during the initial run of the manipulator arm in connection with a particular workpiece to be welded. More particularly, the piston rod 104 is magnetized and a magnetically sensitive reed switch 200 (FIG. 11) is positioned so that it can detect when the piston within the cylinder 94 has been moved to its lowermost position. The reed switch 200 is mounted in a nonmagnetic block 202 which is slidable along the length of a rod 204 which is mounted on the side of the cylinder 94 by means of the screws 206 and is offset therefrom by means of the spacers 208. The block 202 may be adjustably positioned along the length of the rod 204 by means of the screws 210 (FIG. 1) which lock the block in adjusted position. The wires 212 from the reed switch 200 and the wires 214 from the crash switch 60 are enclosed in the flexible tubing 216 (FIG. 8) which extends through aligned openings 218 in the top plate 70 and the bottom wall of the mounting block 54, the tubing 216 being clamped to the underside of the top plate 70 by means of the clamp 220 and being formed in a coil 222 above the terminal strip 224 mounted on the top of the light projector housing 226 so as to permit downward movement of the image sensing assembly to the image sensing position shown in dotted lines in FIG. 4.

In accordance with an important aspect of the present invention, the short length of fibre optic cable 24 between the image sensing assembly and the camera 26 is also employed as a conduit for all of the control and power conductors of the image sensing assembly so that only one cable i.e. the fibre optic cable 24 interconnects the units 20 and 26 (FIG. 1). Also the control and power conductors are supplied in the same cable 28 to the image processing portion of the console equipment to minimize the number of cables that need be connected to install the image sensing assembly on a given industrial robot. More particularly, the conductors 212 from the reed switch 200 and the conductors 214, from the crash switch 60 are connected to terminals on the terminal strip 224 to which terminals corresponding conductors within a cable 230 (FIG. 4) are also connected. The cable 230 is provided with a protective sheath 232 which is clamped to the side of the lens housing 88 by means of the clamp 234. The lens system within the housing 88 is optically coupled to a fused fibre optic faceplate 236 into the interior of which the cable 230 extends. The faceplate 236 acts as a 45° end tip for the fibre optic cable which is positioned within a tubular member 238 which is slidably mounted on the top plate 70 for vertical movement to permit the image sensing assembly to be moved to the image sensing position shown in dotted lines in FIG. 4. More particularly, a collar 240 is mounted on the top plate 70 by means of the bolts 242 (FIG. 14), a gasket 244 being employed to seal the space between the tube 238 and the collar 240. The optical fibers of the cable 24 together with the cable 230 are positioned within a flexible outer sheath 246 and a corrugated protective boot 248 is connected at its upper end to the tube 238 and at its bottom end to the collar 240 to ensure that smoke and fumes do not enter the image sensing unit while permitting the sliding movement of the tube 238 within the top plate 70 to accommodate movement of the image sensing assembly to the sensing position. The 45° end tip 236 is surrounded by a nylon bearing 250 (FIG. 4) which serves as a limit stop at times when the fibre optic cable is accidentally pulled. The end tip 236 is held within the housing 88 by means of the screws 252.

At the camera end of the fibre optic cable 24 a tubular end portion 270, similar to the tubular portion 238, is clamped in an adjustable bracket 272 mounted on the front end of the camera 26. The cable 230, which carries the control wires from the reed switch 200 and crash switch 60, is led out of the tubular member 270 within the camera housing 274 and is connected to a quick disconnect connector 276. The connector 276 is connected to the cable 278 which forms a part of the cable 28 which also supplies the output signals from the camera 26. The cable 230 also includes a pair of conductors for supplying electric power to the terminals 221 and 223 on the top of the lamp housing 226 to which the incandescent lamp within the housing 226 is connected.

The tubular end 270 of the cable 24 touches the end of a fibre optic faceplate transition member 280 which is optically coupled to the photodiode array 282 of the camera 26. With such an arrangement the overall length of the camera housing 274 may be relatively small so that the camera 26 may be placed on industrial robots having a relatively short upper arm portion 16.

In accordance with a further important aspect of the present invention, means are provided for introducing air under pressure into the space 76 surrounding the lens assembly 88 and the light projector 78 when the doors 120, 122 are closed so as to prevent fumes and smoke produced during the welding operation from entering the space 76 and damaging the image sensing assembly.

More particularly, air from the control line 194, which supplies air to the bottom of the cylinder 94 and holds the image sensing assembly in the up position, is supplied to a control valve 260 (FIG. 4) the outlet 262 of which supplies an adjustable air pressure to the space within the housing 180 and the well 100. Air under pressure is thus supplied through the aligned openings 218 in the top plate 70 and the bottom wall of the mounting block 54 into the space 76 surrounding the lens system 88 and the light projector system 78. Accordingly, the space 76 is pressured and air issues out of the small cracks between the ends of the doors 120, 122 and the end walls 74 so that no smoke, fumes or splatter can enter the space 76 during the welding process and damage the image sensing assembly.

A silicone rubber sheath 273 surrounds the welding torch at the area of closure of the protective doors. The sheath provides a compliant low friction and high temperature seal along the contact line formed by the protective doors and the torch body.

Obviously, many modifications and variations of the present invention are possible in light of the above teachings. Thus it is to be understood that, within the scope of the appended claims, the invention may be practiced otherwise than as specifically described hereinabove.

What is claimed and desired to be secured by Letters Patent is:

1. An image sensing arrangement for a manipulator arm having a plurality of arm sections interconnected by rotary joints and a hand rotatably connected to the end of the outermost one of said arm sections,
   a welding torch connected to said hand;
   a sensing assembly carried by said hand and movable relative to said welding torch, said assembly comprising a projection source and an optical sensing unit including an objective lens;
   a camera mounted on said outermost arm section;
   a fibre optic cable connected between said objective lens and said camera to permit rotation of said hand relative to said outermost arm section and movement of said assembly relative to said welding torch;
   means for normally positioning said assembly within a housing carried by said hand; and
   means for moving said assembly along a line parallel to the axis of said welding torch to a sensing position outside said housing.

2. An image sensing arrangement as set forth in claim 1, wherein said housing is substantially completely enclosed when said assembly is positioned therein, thereby to protect said assembly during the welding operation.

3. An image sensing arrangement as set forth in claim 2, which includes means for introducing a stream of air into said housing when said assembly is positioned therein, thereby to prevent the entry of smoke and fumes into said housing during the welding operation.

4. An image sensing arrangement as set forth in claim 1, which includes air cylinder means mounted in the end of said arm and having a piston connected to said image sensing assembly for movement thereof along said line.

5. An image sensing arrangement for a manipulator arm which is movable in a plurality of axes, comprising a weld torch carried on the end of said arm, an image sensing assembly including a light projector adapted to project light in a predetermined pattern on the area beneath the end of said weld torch and an image sensing unit for sensing the image formed by the projection of said light pattern onto an object in said area, means for normally positioning said assembly within a housing carried on the end of said arm, and means for moving said assembly along a line parallel to the axis of said weld torch to a sensing position outside said housing.

6. An image sensing arrangement as set forth in claim 5 wherein said housing is substantially completely enclosed when said assembly is positioned therein, thereby to protect said assembly during the welding operation.

7. An image sensing arrangement as set forth in claim 6, which includes means for introducing a stream of air into said housing when said assembly is positioned therein, thereby to prevent the entry of smoke and fumes into said housing during the welding operation.

8. An image sensing arrangement as set forth in claim 5, which includes a post connected to said assembly on one side of said weld torch and slidably mounted on said hand, and an air cylinder mounted on said hand on the other side of said weld torch and having a piston connected to said assembly for moving the same along said line.

9. An image sensing arrangement as set forth in claim 8, which includes means for sensing the position of said piston.

10. An image sensing arrangement as set forth in claim 8, wherein said piston has a magnetized piston rod, and a magnetic reed switch is positioned outside said air cylinder for detecting the presence or absence of said piston rod.

11. An image sensing arrangement as set forth in claim 10, which includes a rod mounted on the side of said air cylinder and extending along the length thereof, and nonmagnetic means for adjustably positioning said reed switch along said rod.

12. An image sensing arrangement as set forth in claim 5 wherein said housing has an opening in the bottom wall thereon through which said assembly can be moved to said sensing position, and closure means pivotally mounted on said housing and adapted to close said opening when said assembly is positioned within said housing.

13. An image sensing arrangement as set forth in claim 12, wherein said closure means comprises a pair of doors pivotally mounted on opposed edges of said bottom wall opening, and means for holding said doors in a horizontal position when said assembly is in said normal position, thereby completely to shield said assembly during the welding operation.

14. An image sensing arrangement as set forth in claim 5, wherein said light projector projects light along an axis parallel to the longitudinal axis of said weld torch.

15. An image sensing arrangement for a manipulator arm which is movable in a plurality of axes, comprising a mounting block positioned on the end of said arm and having an opening extending therethrough, a weld torch mounted in said opening and extending downwardly therebelow, a housing secured to said mounting block and extending downwardly therefrom to enclose a portion of said weld torch, an image sensing assembly including a light projector adapted to project light in a predetermined pattern on the area beneath the end of said weld torch and an image sensing unit for sensing the image formed by the projection of said light pattern onto an object in said area, means for normally positioning said assembly within said housing, and means for moving said assembly along a line parallel to the longitudinal axis of said weld torch to a sensing position outside said housing.

16. An image sensing arrangement as set forth in claim 15, wherein said light projector is positioned on one side of said weld torch and said image sensing unit is positioned on the other side of said torch when said image sensing assembly is in said normal position within said housing.

17. An image sensing arrangement as set forth in claim 15, which includes a bracket slidably mounted on said mounting block for movement along said line, said bracket having an opening through which said weld torch extends, means for mounting said light projector on said bracket adjacent one side of said weld torch, and means for mounting said image sensing unit on said bracket adjacent the other side of said weld torch.

18. An image sensing arrangement as set forth in claim 17, which includes an air cylinder mounted on said mounting block and having a piston connected to said bracket for moving said image sensing assembly to said sensing position.

19. An image sensing arrangement as set forth in claim 18, which includes a post slidably mounted in said mounting block for movement along said line, and means connecting said post to said bracket to provide a bearing therefor.

20. An image sensing arrangement as set forth in claim 19, wherein said air cylinder piston and said post are positioned on opposite sides of said weld torch to provide spaced apart bearings for said bracket.

21. An image sensing arrangement as set forth in claim 17, wherein said housing has an opening in the bottom wall thereon through which said assembly can be moved to said sensing position, and closure means pivotally mounted on said housing and adapted to close said opening when said assembly is positioned within said housing.

22. An image sensing arrangement as set forth in claim 21 wherein said closure means comprises a pair of doors pivotally mounted on opposed edges of said bottom wall opening, and means interconnecting said doors and said bracket so that said bottom wall opening is closed by said doors when said assembly is in said normal position.

23. An image sensing arrangement as set forth in claim 22, wherein said interconnecting means comprises a pair of flexible members connected between each of said doors and said bracket.

24. An image sensing arrangement as set forth in claim 23, which includes spring means connected in series with said flexible members for resiliently biasing said doors to said closed position.

* * * * *